United States Patent [19]

Beltz

[11] Patent Number: 5,064,933
[45] Date of Patent: Nov. 12, 1991

[54] BENZOPHENONE-TYPE POLYIMIDES AND THEIR PRODUCTION

[75] Inventor: Mark W. Beltz, Baton Rouge, La.

[73] Assignee: Ethyl Corporation, Richmond, Va.

[21] Appl. No.: 576,848

[22] Filed: Sep. 4, 1990

[51] Int. Cl.⁵ ............................................. C08G 73/10
[52] U.S. Cl. .................... 528/220; 528/222; 528/229; 528/272; 528/274; 528/289; 528/290; 528/292; 528/491; 528/495; 528/499
[58] Field of Search .............. 528/220, 222, 229, 272, 528/274, 289, 290, 292, 491, 495, 499

[56] References Cited

U.S. PATENT DOCUMENTS

| | | | |
|---|---|---|---|
| 4,816,516 | 3/1989 | Yamaya et al. | 525/180 |
| 4,937,316 | 6/1990 | Ohta et al. | 528/353 |
| 4,937,317 | 6/1990 | Pratt et al. | 528/353 |
| 4,959,440 | 9/1990 | Tamai et al. | 528/125 |

Primary Examiner—John Kight, III
Assistant Examiner—Sam A. Acquah
Attorney, Agent, or Firm—Richard J. Hammond

[57] ABSTRACT

Benzophenone-type polyimides having repeating groups of the formula

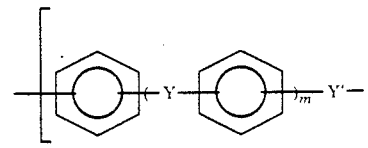

-continued

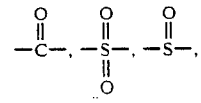

where Y and Y' are the same or different and are a chemical bond, —O—, —S—,

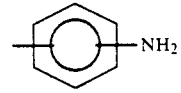

—CH$_2$—, —C(CH$_3$)$_2$—, —CF$_2$, —C(CF$_3$)$_2$— or —Si(CH$_3$)$_2$— and m is 0 or 1, are produced from monomers of the formula

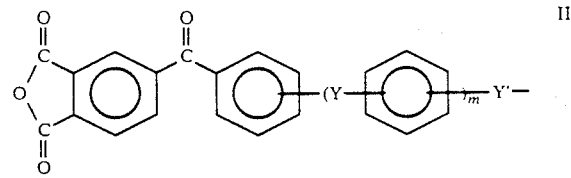

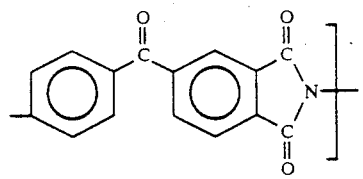

7 Claims, No Drawings

BENZOPHENONE-TYPE POLYIMIDES AND THEIR PRODUCTION

This invention relates to benzophenone-type polyimides and to methods for preparing such polymers. Their polymeric compounds are useful, inter alia, as thermally stable molding powders and for use in prepregs.

Linear aromatic or heterocyclic condensation-type polyimides have been an item of commerce for over two decades. The polymer systems that have shown the most success are those that utilize the reaction product of an aromatic dianhydride and aromatic diamine. Because of the difficulty in shaping, coating or other processing of the polyimides produced from the above starting materials, it has been found more convenient to first form a solution of polyamic acid intermediate, and then to thermally or chemically imidize this intermediate. It has further been found that the control of the physical properties e.g. viscosity of the intermediate can be more easily effected if an end-capping agent is added to the reaction system. These end-capping agents are typically those that carboxylate the terminal amino groups of the developing polyamic acids, advantageously resulting in compositions of high solids but lowered viscosity.

While the polyamic acid/end-capping route leading to a final polyimide has proven effective for fabrication, it does not lend itself to processing techniques requiring meltable solids as starting materials, for example, as extrusion or molding powders.

Further, in many cases it is not economical to produce fabricated parts using a two step process i.e. first forming the polyamic acid and then the polyimide.

There remains a need for providing polyimides that can be isolated as a powder from a simple one-step reaction.

In accordance with this invention there is provided a new class of benzophenone-type polyimides having repeating units of the formula

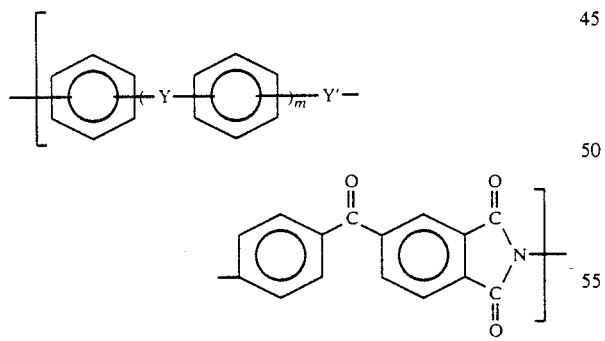

wherein Y and Y' are the same or different and are a chemical bond, —O—, —S—,

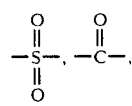

—CH$_2$—, —C(CH$_3$)$_2$—, —C(CF$_3$)$_2$— or —Si(CH$_3$)$_2$—, and m is 0 or 1.

In the above polyimides, it is preferred that m is 0 and Y' is a chemical bond. —O—, —CH$_2$—,

—C(CH$_3$)$_2$— or —C(CF$_3$)$_2$—.

Aromatic ketones used to prepare the polyimides of the present invention are those unsymmetric compounds having the formula

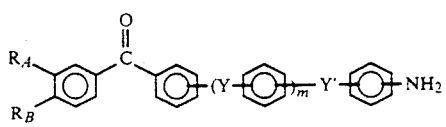

where R$_A$ is the same or different than R$_B$ and individually are —COOH, —COOR, or taken together form an anhydride ring where R$_1$ is C$_1$ to C$_{12}$ linear or branched alkyl and Y and Y' are the same or different and are a chemical bond, —O—, —S—,

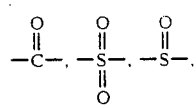

—CH$_2$—, —C(CH$_3$)$_2$—, —CF—$_2$, —C(CF$_3$)$_2$—or —Si(CH$_3$)$_2$—, and m is 0 or 1 e.g., the compounds

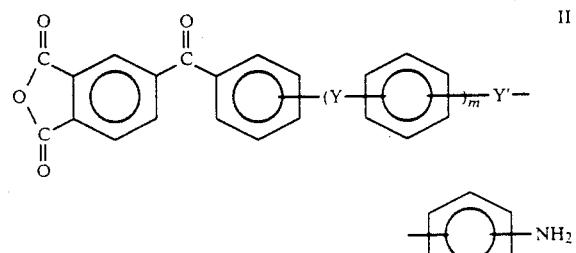

In the compounds of formula I, it is preferred that R$_A$ and R$_B$ are the same and are the group carboxylic acid (i.e. —COOH), or the anhydrides illustrated by the compounds of formula II. Thus, those preferred compounds of formula I can be the free dicarboxylic acids i.e., R$_A$=R$_B$=—COOH or their esters, i.e., R$_A$ and R$_B$ are —COOR$_1$ where R$_1$ is C$_1$ to C$_6$ alkyl. Typical esters are the methyl, ethyl, n-propyl, n-butyl, n-pentyl, n-hexyl esters.

In the above preferred compounds preferably m is 0 and Y' is a chemical bond, —O—, —CH$_2$—,

—C(CH$_3$)$_2$—, or —C(CF$_3$)$_2$.

The most preferable are those of formula I where R$_A$ and R$_B$ are taken together to form the anhydride ring, m is 0 and Y' is —O—.

The compounds of formula I are prepared by the facile reduction of the corresponding nitro precursors (to the free amine group). A variety of reducing agents can be used to carry out such reduction, i.e., Pd on carbon, lithium aluminum hydride, Raney nickel, etc. with the resulting amine being easily derivatized by further reaction with, for example. alkyl halides (i.e. methyl or ethyl bromide) to form N-alkylamino derivitives or similar reactions with aromatic halides to give the N-arylamino groups.

Illustrative of the compounds of formula I are the following:

benzophenone-4-(4''-aminophenyl)-3',4'-dicarboxylic acid;
benzophenone-4-(4''-aminophenyl)-3',4'-dicarboxylic acid dimethyl ester;
benzophenone-4-(4''-aminophenyl)-3',4'-dicarboxylic acid diethyl ester;
benzophenone-2-(4''-aminophenyl)-3',4'-dicarboxylic acid;
benzophenone-2-(4''-aminophenyl)-3',4'-dicarboxylic acid dimethyl ester;
benzophenone-2-(4''-aminophenyl)-3',4'-dicarboxylic acid diethyl ester;

As noted earlier the precursor nitro compounds are readily prepared by the well known Friedel Crafts acylation procedure, i.e.,

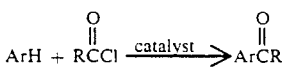

where Ar is an aromatic nucleus and R is aryl or alkyl such as the group

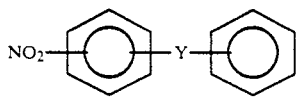

where Y is as previously defined.

In such reaction, catalysts are typically of the Lewis or Bronsted acid type, such illustrated by ferric chloride, aluminum chloride, boron trifluoride, etc. However, triflic acid (trifluoromethanesulfonic acid, $CF_3SO_3H$) or similar sulfonic acids have proven to be especially active acylation catalysts. Thus acids known in the art as Super acids such including fluorosulfonic acid, Magic Acid (hydrofluoric acid and antimony pentafluoride) as well as other halo fluoromethanesulfonic acids are useful in causing the reaction to prepare the compounds of the present invention. The following reaction path is illustrative of the preferred method of preparation of the precursor compounds.

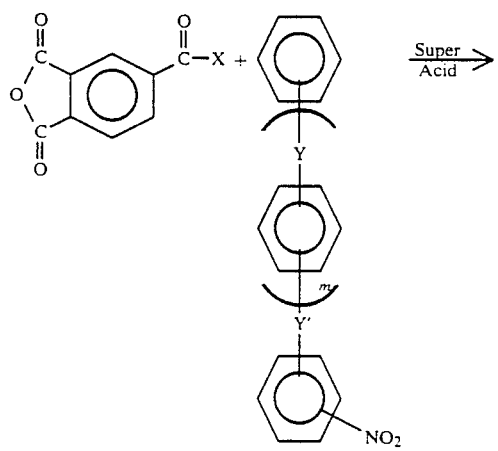

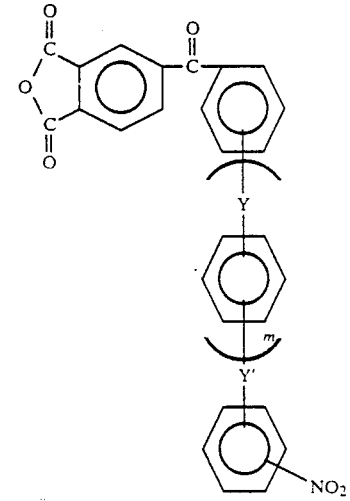

Because these superacids are exceptionally active in causing the acylation to occur as shown above, the general requirement of having a 1:1 mole ratio of acyl halide to Lewis Acid does not apply. See for example U.S. Pat. No. 4,802,791. Thus, surprisingly small amounts of super acid are effective in causing the acylation reaction. From about 0.1% by weight to about 50% by weight of super acid based on the amount of acyl halide will catalyze this reaction. Depending on the reactivity of the aromatic hydrocarbon (i.e.) methyl substituted are more reactive than unsubstituted ones; smaller amounts of triflic acid can be used (<0.1% preferred).

As discussed earlier, concerning the amount of $CF_3SO_3H$ necessary to affect the conversion, activated aromatics require lower temperatures than do the deactivated ones.

As indicated from the reaction path shown above, the initial reaction to form the compounds of the present invention is a modification of the Friedel Crafts acylation reaction utilizing an anhydride-substituted aromatic acid halide. The product of the reaction is anhydride-substituted benzophenone compound of formula II. These compounds can be readily transformed into the compounds of formula I where $R_A$ and $R_B$ are the same or different and are $C_1$ to $C_{12}$ linear or branched alkyl esters by an alcoholysis reaction, i.e., reaction of the anhydride with an aliphatic alcohol. While the reaction is typically catalyzed by acids e.g., $H_2SO_4$, Lewis Acids or bases, the preferred catalyst is pyridine or a dilute alcoholic solution of an alkali metal hydroxide.

Similarly, rather than alcoholysis, the compounds of formula I can be converted to the dicarboxylic acids (where $R_A$ and $R_B$ are both the group —COOH) by simple hydrolysis e.g., reaction with water. Such reaction may be conducted with or without a catalyst e.g., an organic or inorganic base.

The alcoholysis reaction and the hydrolysis reaction of the anhydride of the compounds of formula I are well known in the prior art. See for example, the text by March, Advanced Organic Chemistry, McGraw-Hill, New York, N.Y.

Oxidation of compounds of Formula 1 where $R_A$ and $R_B$ are alkyl ester carboxylate groups ca be expected to lead to benzophenonetetracarboxylic acids, monomers that are useful in polyimide preparations.

Polymerization of the compounds of formula I involve the heat treatment of a solution of these compounds in a suitable inert solvent. These solvents include N-methylpyrolidone, dimethyl acetamide, dimethylformamide, dimethylsulfoxide, p-cresol, etc. typically admixed with benzene, toluene or xylene. The reaction is somewhat faster at higher temperatures (up to 210° C.) and proceeds readily to completion with the removal of water by, for example, distillation. Thus, a preferable solvent is a mixture of N-methylpyrolidone and xylene which azeotropes at 171° C., gradually rising to the boiling point of N-methylpyrrolidone as the xylene/water azeotrope is removed. However, temperatures of reaction below 140° C. provide a unacceptably slow polymerization reaction.

The polymers of this invention can be used for production of films, fibers, membranes, coatings, plaques, foams, laminates, adhesives, composites, tubes, and molded products of various shapes and configurations, the utility in any given case being governed to some extent by the molecular weight and physical properties of the particular polymer at hand.

In order for those skilled in the art to be better able to practice the present invention, the following examples are given by way of illustration and are not to be taken as limiting the scope of the invention in any way.

EXAMPLE 1

Synthesis of
1,3-bis[(4-nitrophenoxy)-4'-benzoyl]benzene (BNBB)

A mixture of 4-nitrophenyl phenyl ether (5.0 g), isophthaloyl dichloride (2.4 g) and triflic acid (0.02 g) was stirred under nitrogen for 5.5 hours at 198° C. The reaction mixture was taken up in toluene (100 ml) and stirred with 10% caustic for 30 minutes. The pH of the solution was brought to 7 and the organic layer was separated, dried with anhydrous $Na_2SO_4$ and the toluene stripped off. The residue was crystallized from isopropanol, and dried to give 1.8 g of product. NMR and Mass Spectral Data were consistent with the structure. Additional 1.2 g of BNBB was recovered from the mother liquor. Total amount of product recovered was 3 g accounting for a 45% overall yield based on the initial amount of isophthaloyl chloride.

EXAMPLE 2

Synthesis of
1,3-bis[(4-aminophenoxy)-4'-benzoyl]benzene (BABB)

A 1 g sample of BNBB in 25 ml ethyl acetate was catalytically hydrogenated at room temperature. An initial pressure of 60 psi was maintained for three hours and the reaction continued further overnight. In the end, the reaction mixture was filtered and the excess solvent was removed to give a foamy product (0.93 g). The spectral data was consistent with the structure of BABB.

EXAMPLE 3

Preparation of
Benzophenone-4-(4''-nitrophenoxy)-3',4'-dicarboxylic acid (BNPA)

A mixture of 4-nitrophenyl phenyl ether (NDPE, 0.5M), trimellitic anhydride chloride (TMC,0.5M) and trifluoromethanesulfonic acid (4% by weight of TMC) was stirred at 150° C. for 3 hours with a $N_2$ sweep to a caustic scrubber. After cooling to 70° C., an aqueous sodium hydroxide solution (1200 ml $H_2O$, 0.53 mole NaOH) was added with constant stirring. While maintaining the temperature at 70° C., the aqueous layer was extracted with toluene (four 300 ml portions). The aqueous layer was cooled to room temperature to yield white product. The product was filtered, rinsed with water, and dried in vacuum oven to give 103.4 g of off-white solid. This solid was recrystallized from water to yield 94.1 g (Solid A). Based on spectral and wet analysis data, Solid A was determined to be the mono sodium salt of BNPA (Solid A). Five grams of the mono sodium salt of BNPA was stirred in water (45 ml) containing conc. sulfuric acid (2.6 g) for about 24 hours at room temperature. The mixture was filtered, rinsed with water, and vacuum dried at 80° C., to yield 4.6 grams (97%). The structure of this solid was determined as BNPA by a combination of GC/MS, $^1H$ and $^{13}C$ NMR BNPA was converted to its dimethyl ester and analyzed by mass spec. The exact mass of the dimethyl ester was determined to be 435.092, which corresponded to the formula $C_{23}H_{17}NO_8$. $_1H$ NMR ($d_6$-DMSO):7.22–7.38 (2 doublets, 4H), 7.76–7.94 (3 doublets, 4H), 7.96–8.03 (s,1H), 8.19–8.33 (d,2H). The total acid titration value was 4.707 meq/g for an estimated purity of 96%. The major product of the above reaction was thus determined to be benzophenone-4-(4''-nitrophenoxy)-3',4'-dicarboxylic acid.

EXAMPLE 4

Preparation of
benzophenone-4-(4''-aminophenoxy)-3',4'-dicarboxylic acid (BAPA)

Solid A (20.0 g) was dissolved in 1% caustic solution (2 g of NaOH in 200 ml water) and hydrogenated (65 psi initial $H_2$ pressure) at room temperature in the presence of 1 g of 10% Pd/C catalyst for 20 hours. At the end of the reaction, an additional 0.2 g of NaOH was added to solubilize the solid formed during hydrogenation. The solution was filtered to remove the catalyst and neutralized with glacial acetic acid to form a fluffy white precipitate. The precipitate was cooled in an ice bath, filtered, rinsed with cold water, and vacuum dried at 40° C. to yield 15.4 g of off-white solid. A second hydrogenation was carried out by a similar procedure to generate 15.3 g of product. The combined products (30.7 g) from the two runs were digested at about 70° C. in a 80:20 mixture of isopropyl alcohol/water. This mixture was cooled to room temperature, stirred for several hours and filtered. The product was dried at 40° C. in a vacuum oven to yield 23.7 g product which was identified as BAPA. The structure of this solid was confirmed by $^1H$ and $^{13}C$. $^1H$ NMR ($d_6$-DMSO):6.51–6.71(d,2H), 6.76–6.91 (d,2H), 6.91–7.09 (d,2H), 7.66–7.79 (d,2H), and 7.94–8.07 (s,1H). The total acid titration value was 4.941 meq/g for an estimated purity of 93%.

EXAMPLE 5

Benzophenone-4-(4''-aminophenoxy)-3',4'-dicarboxylic acid (BAPA), 20.00 g, 0.05300 mole, was charged into a 250 mL round bottom flask equipped with a nitrogen inlet, Dean-Stark trap with condenser, mechanical stirrer, and thermometer. N-methylpyrrolidone, 100 mL was added and stirred when the BAPA dissolved 50 mL of xylenes was added and the reaction mixture was heated to 170° C. Water started to azeotrope over with the xylenes. When the stoichiometric amount of water was obtained, the xylenes were distilled out of the polymerization. The temperature of the polymerization slowly rose to 200° C. at which time the heat source was removed and the polymerization was left to cool to room temperature. The polymer, which started to precipitate from solution near 185° C., completely precipitated forming a swollen mass. The polymer mass was precipitated in 1 L of methanol in a high speed blender. The polymer was filter washed with 200 mL of methanol and air dried on the filter funnel. The polymer was then dried over night in a forced air oven at 200° C. The yellowish brown powder was ground to afford 16.61 g (91.83%) of product. The polymer had a Tg of 275° C. by DSC analysis.

I claim

1. A polyimide having repeating units of the formula

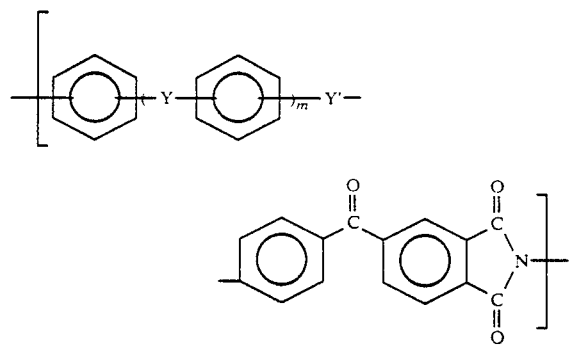

where Y and Y' are the same or different and are a chemical bond, —O—, —S—,

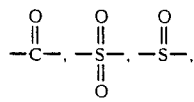

—CH$_2$—, —C(CH$_3$)$_2$—, —CF$_2$, —C(CF$_3$)$_2$— or —Si(CH$_3$)$_2$— and m is 0 or 1.

2. The polyimide according to claim 1 wherein m is 0 and Y' is a chemical bond, —O—, —CH$_2$—,

—C(CH$_3$)$_2$— or —C(CF$_3$)$_2$—.

3. The polyimide according to claim 2 wherein Y' is —O—.

4. A process for preparing polyimides of the formula

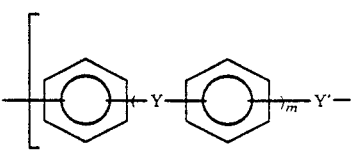

comprising treating a compound of the formula

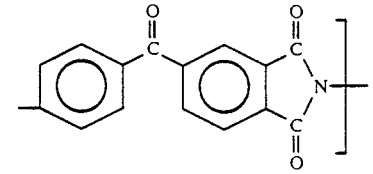

where R$_A$ and R$_B$ are each independently —COOH, —COOR or taken together form an anhydride ring, where R is C$_1$ to C$_{12}$ linear or branched alkyl, Y and Y' are the same or different and are a chemical bond. —O—, —S—,

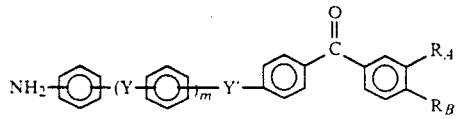

—CH$_2$—, —C(CH$_3$)$_2$—, —CF$_2$, —C(CF$_3$)$_2$— or —Si(CH$_3$)$_2$— and m is 0 or 1.

5. The process according to claim 4 wherein m is 0.

6. The process according to claim 5 wherein Y' is a chemical bond, —O—, —CH$_2$—,

—C(CH$_3$)$_2$— or —C(CF$_3$)$_2$—.

7. The process according to claim 6 wherein Y' is —O—.

* * * * *